United States Patent [19]

Knauss

[11] Patent Number: 4,998,007
[45] Date of Patent: Mar. 5, 1991

[54] ELECTRICALLY HEATED RESERVOIR HAVING A PREASSEMBLED PLURAL TUBE CONTINUOUS FLOW HEATING UNIT

[75] Inventor: Hermann Knauss, Oberderdingen, Fed. Rep. of Germany

[73] Assignee: E.G.O. Elektro-Gerate Blanc u. Fischer, Fed. Rep. of Germany

[21] Appl. No.: 305,601

[22] Filed: Feb. 1, 1989

[30] Foreign Application Priority Data

Feb. 12, 1988 [DE] Fed. Rep. of Germany ....... 3804327

[51] Int. Cl.⁵ .................. H05B 1/02; H05B 1/00; F24H 1/10; A47J 27/024
[52] U.S. Cl. .................. 392/405; 99/403; 126/374; 219/438; 219/441; 219/511; 392/477
[58] Field of Search .............. 219/296, 297, 301, 308, 219/310, 312, 311, 436–438, 441, 442, 328, 331, 511; 99/403–410; 126/373, 374

[56] References Cited

U.S. PATENT DOCUMENTS

| | | | |
|---|---|---|---|
| 696,599 | 1/1902 | Shoenberg et al. | 219/311 X |
| 817,593 | 4/1906 | Shipp | 219/297 |
| 2,582,103 | 1/1952 | Clegg | |
| 4,590,361 | 5/1986 | Del Fabbro | 219/297 |

FOREIGN PATENT DOCUMENTS

| | | |
|---|---|---|
| 346014 | 2/1978 | Austria . |
| 3329793 | 2/1985 | Fed. Rep. of Germany . |
| 8619074 | 1/1987 | Fed. Rep. of Germany . |
| 857463 | 4/1940 | France .................. 219/314 |
| 879421 | 11/1942 | France . |
| 887455 | 11/1943 | France . |
| 1526903 | 4/1968 | France . |

Primary Examiner—Anthony Bartis
Attorney, Agent, or Firm—Eckert Seamans Cherin & Mellott

[57] ABSTRACT

A heating unit (1) for a medium reservoir (2) provided e.g. as a fryer has a sheet metal, U-shaped support (3) with a plurality of continuous flow heater tubes (4) fixed rigidly between its legs provided as flange plates (5, 6) and is in this way constructed as a closed, preassembled unit, which can be subsequently fixed as an entity to the walls (11, 12) of a container in such a way that they on the one hand project freely into the container and on the other hand their electrically conducting parts are accessible from the outside. Directly above the outlets (29) of the tubes of the said heating unit (1) distributed in grid-like manner can be provided a separately heated sensor system (31) with several temperature sensors.

29 Claims, 6 Drawing Sheets

ELECTRICALLY HEATED RESERVOIR HAVING A PREASSEMBLED PLURAL TUBE CONTINUOUS FLOW HEATING UNIT

BACKGROUND OF THE INVENTION

1. Field of the Invention

The invention relates to a medium or media heating unit with at least one upright continuous flow heater which, with a continuous flow tube and flange plates fixed to its ends, has a closed subassembly for fixing to at least one wall of a medium or media reservoir, in which with the flange plates is associated a rear wall connecting the same for forming a recesslike receptacle separated from the interior of the medium reservoir for the continuous flow heater or heaters.

2. Prior Art

European Pat. No. 0,238,955 discloses a heating means with tubular continuous flow heaters, in which the ends of the tubes are fixed, e.g. by soldering to the two facing plate-like flange bodies. This heating means can be fixed as a closed installation subassembly to separate superimposed medium or media chambers, which are interconnected by a suitable medium or media return, in which the medium flows from the upper into the lower medium chamber, from which it again passes through the continuous flow heater into the upper medium chamber. This heating means is very favorable for many applications.

SUMMARY OF THE INVENTION

An object of the invention is to provide a medium heating unit of the aforementioned type, which is advantageously suitable for an arrangement in which the inlets and outlets of the continuous flow heater are located directly in a single medium chamber.

For achieving this and other objects according to the invention, in a medium heating unit of the above-described type the rear wall and the flange plates together with the continuous flow heater form a closed, preassembled unit comprising rigidly interconnected parts for fixing to the walls of the medium reservoir connected above and below the same. Therefore the heating means does not have to be connected to superimposed, separate individual chambers formed by containers, tanks, etc. and can instead be directly inserted in a window-like cutout of an upright and optionally stepped wall of a single container or can be positioned at a limited distance above its bottom. The heating means can extend over the entire associated width of said wall, i.e. can be connected to one or two container outer walls at right angles thereto or one or both ends of the heating means can have a lateral spacing from the associated walls positioned transversely with respect thereto. In cross-section, the heating means projects without any further support in the manner of a freely projecting bracket into the said container. The rear wall can appropriately have a relatively large spacing from the facing container outer wall, so that the means forms a constriction connected at the bottom to its top surface in the said container and through which the medium flows downwards to the bottom of the heating means and therefore to its inlets. Moreover, without additional measures, this leads to a relatively cool sump below the heating means in which the solid particles can be deposited. Particularly as a result of its profile-like cross-section the heating means support having the flange plates and the rear wall or formed exclusively by these, forms an effective reinforcement for the container, so that it is also possible to manufacture relatively large-volume medium reservoirs from thin metal sheets without any risk of deformation under load.

The heating unit can have a single continuous flow heater or a single continuous flow tube, or can be provided with two or more continuous flow heaters juxtaposed in at least one row. The support can be bounded on more than three, e.g. on four or five transversely positioned sides, so that it is constructed e.g. in trough or channel-like manner, so that the trough or channel bottom is formed by the rear wall. The continuous flow tube is appropriately fixed by its upper and/or lower end to the associated flange plate in such a way that it does not project beyond its side located in the container and instead terminates substantially flush therewith. Appropriately the flange plate has for each tube end a shaped collar projecting towards the interior of the medium reservoir into which the tube end can engage over a length which is greater than the sheet metal thickness of the flange plate. The collar permits a frontal welding of the two circular faces, which are approximately located in one plane, of the continuous flow tube and the collar.

In order that the connection between the continuous flow tube end and the flange plate does not form the part projecting furthest beyond the associated side and for further reinforcing the flange plate, the lower and/or upper flange plate is/are provided in the area in which the continuous flow tube or tubes are located with a plate field stepped with respect to the border thereof by means of bends or offsets. At least one such stepped plate field can be provided on the rear wall, being offset with respect to the continuous flow tubes and constructed in such a way that it uninterruptedly passes into the stepped plate fields of both flange plates. This leads to the formation of a fixing edge located in one plane, but stepped with respect to the larger part of the flange plate and with which the support can be fixed to the medium reservoir walls.

Tensile stresses within the heating unit support and with respect to the remaining medium reservoir can be advantageously formed by corresponding profiles appropriately continuing over the length of the support and which are advantageously located in the vicinity of the zones in which the rear wall passes into the flange plates. Such a profile system which also increases the bending resistance of the support can e.g. be constructed in corrugation-like, V-shaped manner, so that one profile leg is located in the plane of the associated flange plate or forms an extension thereof, whereas the other profile leg which is at an acute angle thereto passes in obtuse-angled manner into the rear wall and the two profile legs pass into one another over a pitch circularly curved portion. Thus, in the medium reservoir said profile system projects slightly over the remaining rear wall.

A particularly advantageous further development of the invention comprises at least one reinforcing bar for the medium reservoir being associated with the heating unit. At least one reinforcing bar can be fixed to the support or to its rear wall and on the facing reservoir wall and/or in the vertical direction immediately adjacent to or above the heating unit on the said reservoir wall, as well as the reservoir wall approximately parallel thereto. Thus, in the vicinity of the heating unit outlets a grill or grid is provided, on which can be placed e.g. a frying basket at a precisely defined height above the outlets.

For the precise temperature control of the medium to be heated, which can in particular be a liquid, e.g. oil or fat, water, a washing solution or the like, at least in the flow area of the medium leaving the heating unit in heated form can be provided a temperature sensor of a temperature regulator continuously adjustable to different temperatures. If the temperature sensor is provided with a separate sensor heating body around which the medium admittedly flows but is not used for the heating thereof, there is a rapidly responding temperature rise within narrow temperature limits in the case of e.g. cyclic operation. This is further improved if two temperature sensors are located directly adjacent to one another, but in different thermal coupling with respect to the sensor heating body. Instead of this or in addition thereto such a sensor arrangement can also be provided below the inflow openings or in the immediate vicinity thereof.

At least the medium reservoir wall facing the heating unit rear wall can be constructed in one piece approximately over its entire height or from its top surface into an area below the heating unit. Such a construction is also conceivable for the facing reservoir wall, although this is advantageously further outwardly displaced above the heating unit than below the same, which on the one hand leads to more favorable flow conditions with respect to the heating unit entry and exit and on the other hand the medium reservoir is set back on one side in the lower region, so that a better freedom of movement is ensured for a person working in the standing position on this side.

On the underside of the medium reservoir casing forming a closed unit substantially open to the full width on the underside can be engaged a circular or flat dish-like base part, whose base wall appropriately rises in a shallow manner to the open recess longitudinal side of the heating unit and/or to the opposite reservoir wall, so that it forms a curved flow guidance member immediately below the inlets of all the continuous flow heaters. This base part can also serve as a sump for collecting solid particles and can be provided with a drain for the complete emptying of the medium reservoir.

These and other features of preferred further developments of the invention can be gathered from the claims, the description and the drawings and the individual features can be realized singly or in the form of subcombinations in embodiments of the invention and in other fields and represent advantageous, independently patentable constructions for which protection is hereby claimed.

BRIEF DESCRIPTION OF THE DRAWINGS

Exemplary embodiments now of the invention are described in greater detail hereinafter relative to the drawings, wherein are shown.

DETAILED DESCRIPTION OF THE PREFERRED EMBODIMENTS

The inventive medium heating unit 1 according to FIGS. 1 to 7 forms a mechanical unit non-detachably connected or welded to a medium reservoir 2, although a detachable connection of heating unit 1 to medium reservoir 2 is conceivable. In the represented embodiment the medium reservoir 2 is a fryer container open to its full width on the top surface for receiving a frying basket, but can e.g. also be a boiler or other pressure container closed on its top surface and provided with feeds and drains.

Figure 1:
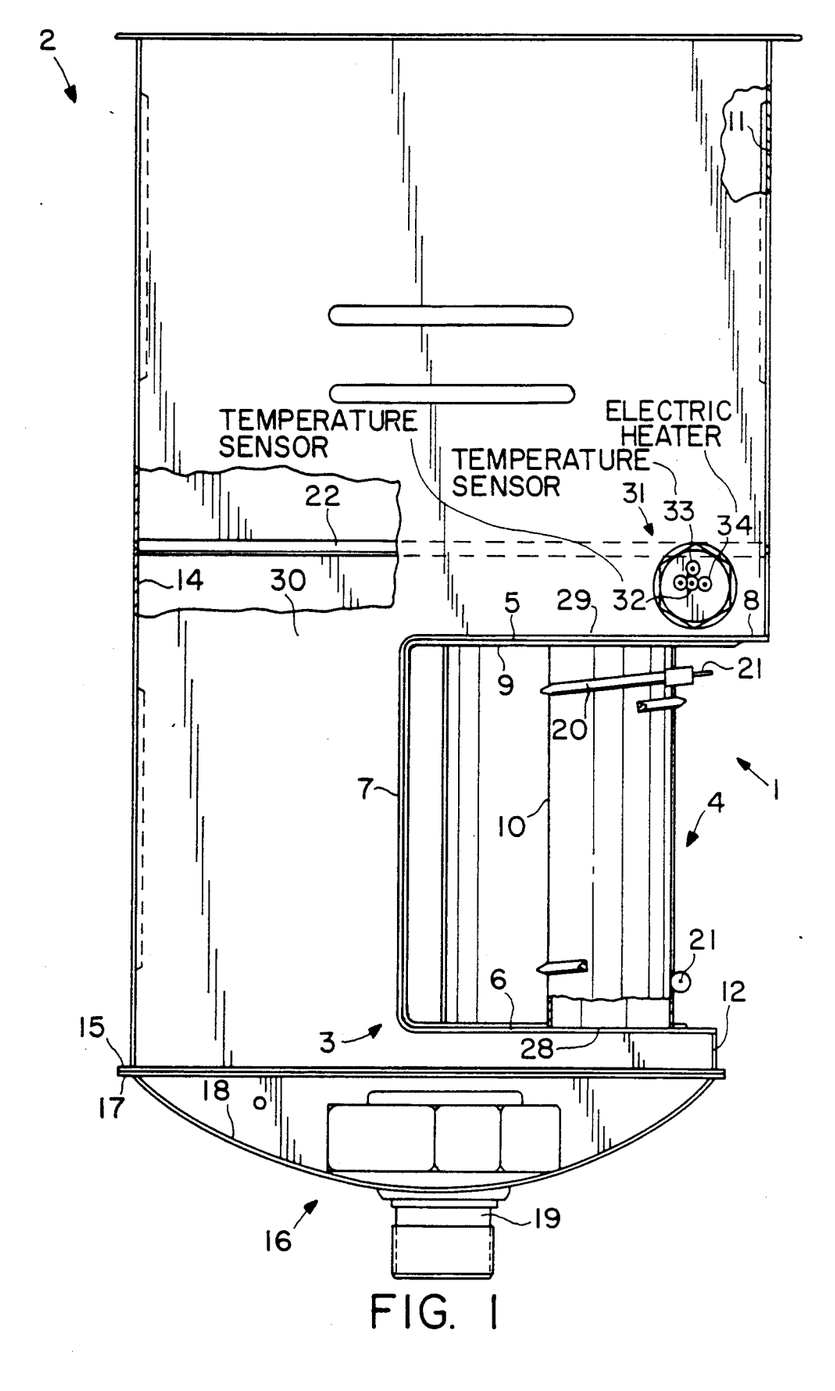
FIG. 1, A medium heating unit arranged on a medium reservoir according to the invention in a part sectional side view.
Figure 2:
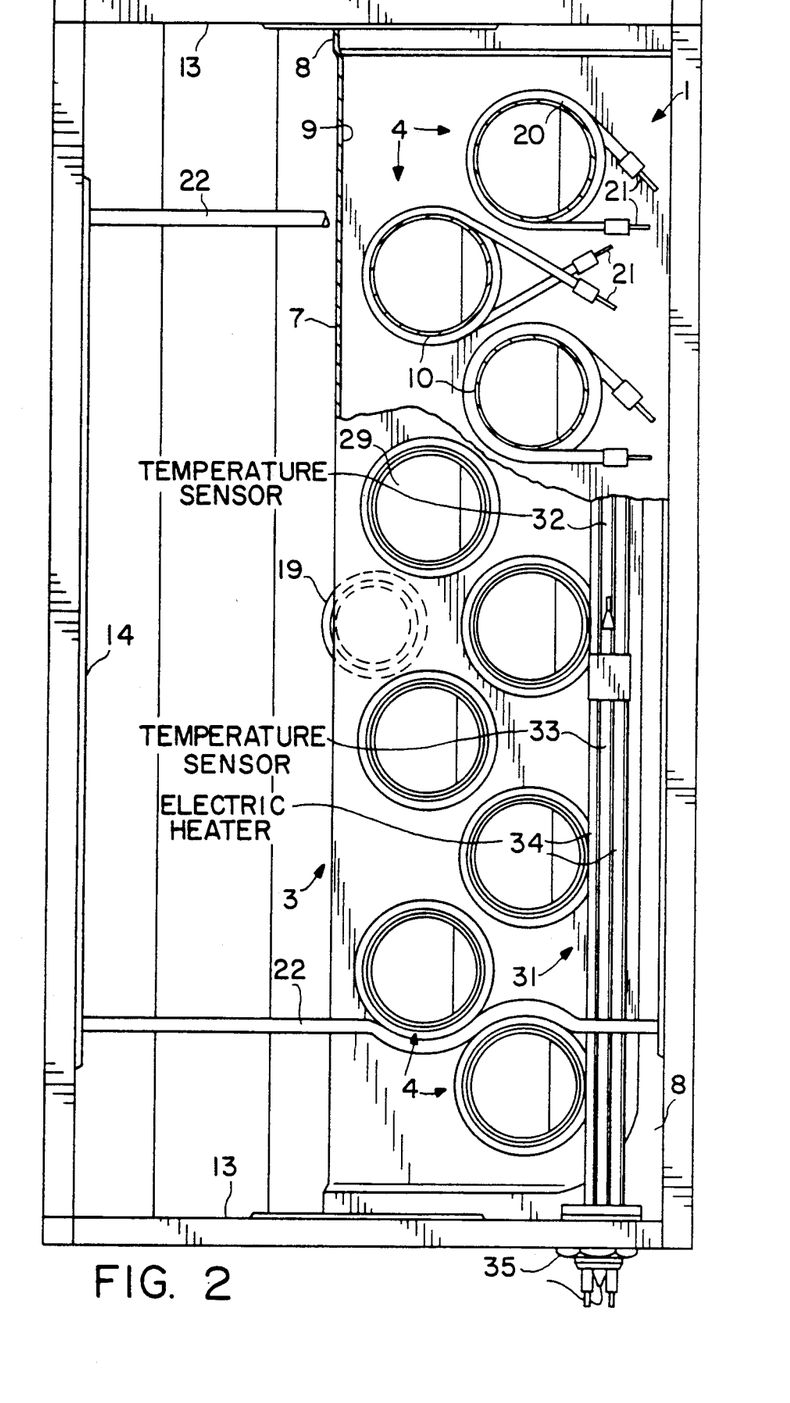
FIG. 2, The arrangement according to FIG. 1 in a part sectional plan view.
Figure 3:
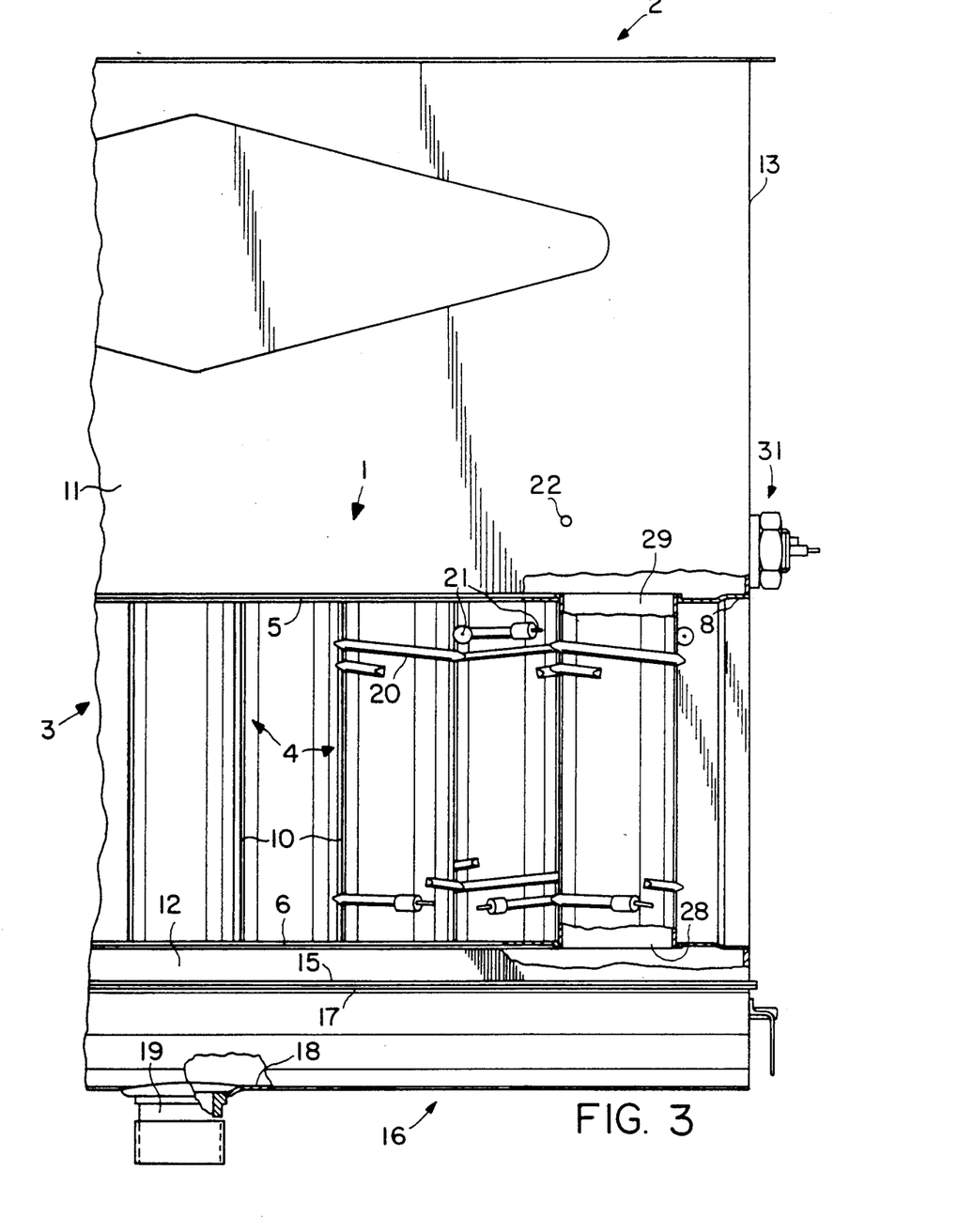
FIG. 3, A detail of FIG. 1 in a view from the right and with a slightly modified construction.
Figure 4:
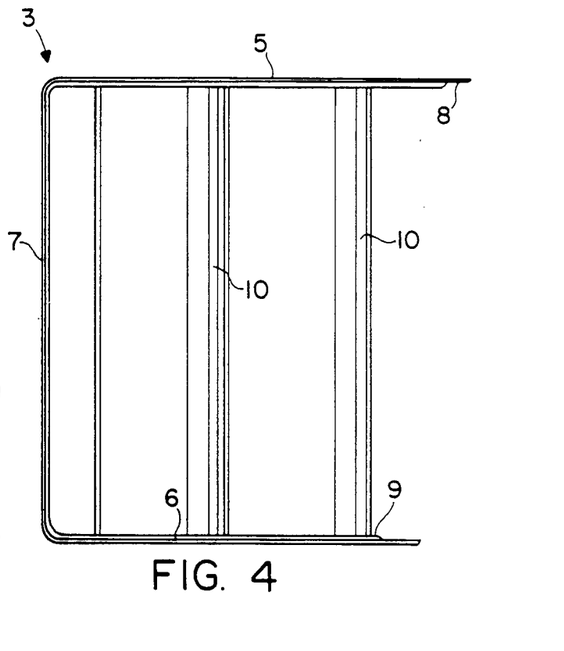
FIG. 4, The medium heating unit in a simplified side view.

The heating unit 1 has support 3, which is U-shaped in vertical section, in one piece and exclusively produced from a single sheet metal part by bending or deep drawing, on which is arranged one or, as shown, several, substantially identical continuous flow heaters 4 in a substantially uniform distribution and arranged both over its length and depth. The two substantially horizontal, parallel U-legs of the support 3 form two equally long flange plates 5, 6, whereof the upper plate is wider than the lower plate by less than the diameter or radius of a continuous flow heater. The U-crossweb of support 3 connecting the two substantially planar flange plates 5, 6 forms the substantially planar or vertical rear wall 7 thereof, whose distance from the nearest continuous flow heaters 4 is approximately the same as the corresponding distance from the front leading edge of the lower flange plate 6 to the furthest forward continuous flow heaters 4. The flange plates 5, 6 and rear wall 7 form a strip-like, closed fixing edge 8 located in different planes at right angles to one another and which runs along the longitudinal and narrow edges of the flange plates 5, 6, as well as along the terminal edges of rear wall 7. The relatively narrow and substantially constant-width fixing edge or border 8 is outwardly offset roughly by its material thickness by means of a bend compared with the remaining plate part located therein of the flange plate 5, 6 and rear wall 7, so that compared with the through-planar plate part 9 in the vicinity of flange plates 5, 6 it is further removed from the facing flange plate and set back in the vicinity of the rear wall 7.

To the flange plates 5, 6 are fixed cross-struts connecting the same and reinforcing the support 3 and which are appropriately exclusively formed by dimensionally identical continuous flow tubes 10 of the continuous flow heaters 4. Each continuous flow tube 10 advantageously passes in uninterrupted manner between two flange plates 5, 6 or the associated, offset plate parts 9 in one piece, so that one or both ends can be directly fixed, e.g. by a circular weld and without any additional intermediate flange to the particular flange plate 5, 6, although a detachable connection, e.g. in accordance with European Pat. No. 0,238,955 is conceivable for certain purposes and reference should be made to this specification for further details and effects.

It is advantageous if the continuous flow tubes 10 having the same external and internal cross-sections over their length are merely formed by strand portions of a correspondingly long, prefabricated tube.

In the represented embodiment the medium reservoir 2 is substantially formed by welded together walls 11 to 14, which have a plate-like construction and are engaged with one another at an angle, so that they form upright or vertical walls. On one longitudinal side the outer boundary of the medium reservoir 2 is formed by two parallel walls 11, 12, but which are reciprocally displaced at right angles to their planes roughly by the difference of the width of flange plates 5, 6. The upper wall extends from the free longitudinal edge of the upper flange plate 5 to the top of the medium reservoir 2 and the lower wall extends from the corresponding longitudinal edge of the lower flange plate 6 to a lower flange edge 15. The lower wall 12 is very low and is therefore only strip-like in the longitudinal direction of support 3.

These separate walls 11, 12 and the heating unit 1, e.g. standing on the front longitudinal side or the operating side of the medium reservoir 2 are connected by two terminal walls 13 at an angle to one another and continuous over their common height, including the height of support 3, to a facing wall 14 parallel thereto which, like walls 13, continues through to the top of the medium reservoir 2 and passes at the lower end into the common flange edge 15. In the represented embodiment the walls 13 are cutout corresponding to the profile of support 3, so that the latter can engage with its ends in said cutouts and remains open at its ends. However, it is also conceivable to lead away one or both walls 13 over the ends of support 3 and to close same at said ends in such a way that it is only open at one side in troughlike manner. The fixing edge 8 of support 3 is engaged at an angle with its free edge on several or all of the walls 11 to 14 in such a way that in each case there is formed a fillet bounded by two longitudinal edges at an angle to one another and in which can be placed a weld.

As a result of the described construction the heating unit 1 forms a braced reinforcing profile for the medium reservoir 2, which is substantially completely located within the ground plan of walls 11 to 14, i.e. does not project outwards beyond the medium reservoir 2. As the heating unit 1 is substantially located below the useful or work space of the medium reservoir 2 used in the case of a fryer for receiving a frying basket, below said work space it forms a displacement body projecting into the medium reservoir 2 and through which, despite substantially through, upright walls, the horizontal cross-sections of the medium reservoir 2 are significantly reduced below the work space, so that the filling volume for the medium reservoir 2 can be kept relatively small. This also leads to the formation of a relatively narrow back-flow channel emanating from the underside of the work space and which is bounded on one side by rear wall 7 and on the other side by the facing, substantially planar, through wall 14 passing over the work space and the back-flow channel. In the manner of an inspection opening, the back-flow channel is made sufficiently wide that it is readily possible to clean the base part from above and it is possible to check the cleanness of the apparatus.

To the undersides of walls 12, 13, 14 or on their common, ring-like, outwardly bent flange edge 15 is fixed a base part 16 with a substantially congruent flange edge 17, e.g. by welding. The base part 16 has a channel or shell-shaped base wall 18, whose shallowly rising shell edges pass directly into the flange edge 17 and is provided at its lowest point with a drain connection 19, to which can e.g. be fixed a stop valve.

Each continuous flow tube 10 is provided with a single heating resistor 20 in the form of a tubular heater passing approximately between the two flange plates 5, 6 and which surrounds in helical manner the outer circumference of tube 10. Constructions according to the aforementioned European patent application are possible. The external diameter of each continuous flow heater 4 is determined by the external diameter of the helix of each heating resistor 20. As can more particularly be gathered from FIG. 2, the continuous flow heaters 4 are arranged in two rows parallel to one another and to the rear wall 7 in such a way that each heater of the rear row in each case engages in the gap between two heaters 4 of the front row and its outer circumference is only at a limited distance from the outer circumferences of said two front heaters.

The internal spacing between adjacent continuous flow heaters of one row is smaller than their external diameter and is approximately half said external diameter. The number of continuous flow heaters in the rear row is smaller by one heater than that in the front row, so that favorable flow conditions are obtained. Moreover, as a result of the described construction, at least part of the heat emitted by the outer circumferences of the heating resistors 20 acts on the adjacent continuous flow tubes 10 or rear wall 7 and is consequently also available as effective heating power.

Each heating resistor 20 has two upper and lower connection ends 21 projecting towards the open channel side of support 3 and which are completely located within the latter. The connection ends 21 of each continuous flow heater 4 of the rear row are led forwards between the two associated adjacent continuous flow heaters of the front row, so that all the connection ends 21 are substantially located in a common wiring plane. The heating resistors of the rear row appropriately have an opposite helical pitch with respect to the heating resistors of the front row, so that in each case two connection ends 21 in the vicinity of the same ends of the associated continuous flow tubes 10 of two adjacent continuous flow heaters 4 of the front and rear row are immediately adjacent to one another and roughly at the same level, while the two other connection ends 21 of said two heaters in the plan view according to FIG. 2 are at an angle to one another.

The underside of the work space of medium reservoir 2 is bounded by a type of grid formed by parallel, juxtaposed, cylindrical reinforcing bars 22 or identical reinforcing profiles, which are fixed by their same ends at the same height to walls 11, 15 and are at a limited distance above the upper flange plate 5. It is e.g. sufficient to have two reinforcing bars 22, whose intermediate spacing is greater than their distance from the adjacent wall 13. In the plan view according to FIG. 2 these reinforcing bars 22 above the heating unit 1 have S-shaped portions in such a way that in plan view they do not cross the internal cross-sections of the associated continuous flow tube 10 and instead pass round the same and consequently do not disturb the flow.

Figure 6:
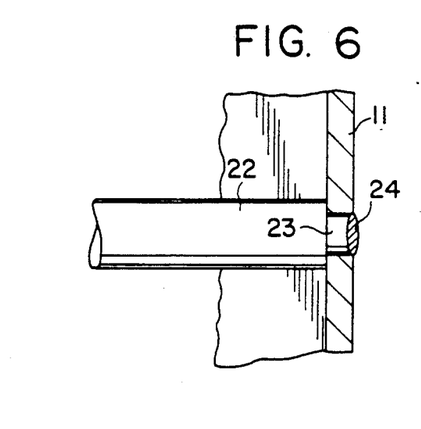
FIG. 6, A detail of FIG. 1 on a larger scale and in section.
Figure 7:
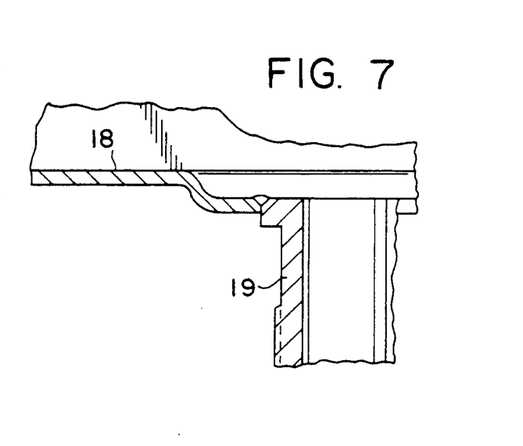
FIG. 7, A detail of FIG. 3 on a larger scale and in section.

FIG. 6 makes it clear how each end of the reinforcing bar 22 is constructed as a diameter-reduced plug 23 inserted in a through bore of the associated wall 11 and whose length at the most as large as the thickness of wall 11. From the outside of wall 11, a spot welding head 24 is applied in the vicinity of the face of plug 23 and on the one hand fixes the reinforcing bar 22 and on the other tightly seals the bore. FIG. 7 shows the fixing of the drain connection 19 having at its upper end a widened collar with which it is inserted in a closely adapted bore in a circular cup-like, downwardly shaped out zone of the base wall 18. From the inside of base wall 18 the drain connection 19 is welded to a circular face seam.

Figure 5:
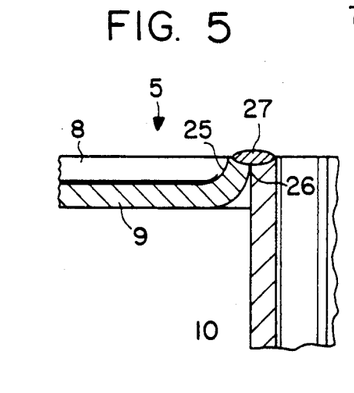
FIG. 5, A detail of FIG. 4 in section and on a larger scale.

The fixing of the particular end of each continuous flow tube 10 to the associated flange plate 5 or 6 is shown in FIG. 5. For the reception of said end the flange plate 5 has a closely adapted plugging opening 26, which is bounded by a ring-like collar 25 shaped out of the plate part 9 and which approximately extends into the plane of the side of fixing edge 8 remote from the facing flange plate. Following the insertion of the continuous flow tube 10, its end and the collar 25 form two circularly nested faces, to which is welded a common, circular face seam 27.

As a result of the described construction the heating unit 1 forms on the underside a plurality of grid-like inlets 28 located in a common plane directly above the associated rising part of the base wall 18 and a corresponding number of outlets 29 located above the same. The medium to be heated is moved upwards by thermosiphon action in the continuous flow tubes 10, whose insides are completely smooth. As all the heating resistors 20 are outside the medium-carrying areas or dry, the medium does not directly act thereon.

The heated medium passing upwards out of the heating unit 1 flows in circuit through the above part of the medium reservoir 2 and then is deflected downwards again into the return-flow channel 30 adjacent to outlets 29, along the base wall 18 back into the inlets 28. As the part of the base wall 18 located on one side of its lowest tip is positioned below the return-flow channel and with its other part is below the inlets 28, particularly favorable flow conditions are obtained.

Immediately above the outlets 29 or immediately below the reinforcing bars 22 but, in the plan view according to FIG. 2, outside the internal crosssections of all the continuous flow heaters 4 is provided a sensor arrangement 31, which is essentially located between the front row of continuous flow heaters 4 and the wall 11, which extends over most of the length of said row and substantially parallel thereto and is only fixed by one end to a wall 13, so that it projects substantially freely. This sensor arrangement 31 has two rod-like or tubular, substantially linear and parallel temperature sensors 32, 33, which are closely adjacent to one another or in contact with one another along a generatrix, temperature sensor 33 being located above the other sensor.

For at least one of the temperature sensors a heating system 34 in the form of a hairpin-shaped tubular heater is provided and between whose two hairpin legs one of the two temperature sensors is arranged in such a way that it is in a common axial plane with said legs. The two temperature sensors 32, 33 appropriately have different lengths. Temperature sensor 33 above temperature sensor 32 and further removed from the heating system 34 and which is not directly in contact therewith, unlike sensor 32, is shorter, namely roughly half as long as sensor 32. The temperature sensors 32, 33 are combined with a heating system 34 to form a common unit, which is fixed by a screw coupling 35 in detachable manner to the associated wall 13. Temperature sensors 32, 33 which, like heating system 34, are flowed round by the medium, form components of two closed, hydraulic expansion systems and are connected by capillary lines (not shown) to siphons, whereof at least one influences the contact of a cyclicly operated power control device or regulator for at least part of the heating resistors 20 and for the heating system 34, which cannot be considered as a medium heating system, because its power only forms a negligible part of the total power of heating unit 1. The longer temperature sensor 3, coupled thermally more closely to the heating system 34 and therefore located between the legs of the hairpin-like tubular heating system 34, serves as a limiting sensor of a temperature limiter for overheating prevention and switches off an adequate number or all the continuous flow heaters in emergencies, such as e.g. in the case of a failure of the thermally adjustable temperature regulator influenced by the temperature sensor 33.

Figure 8:
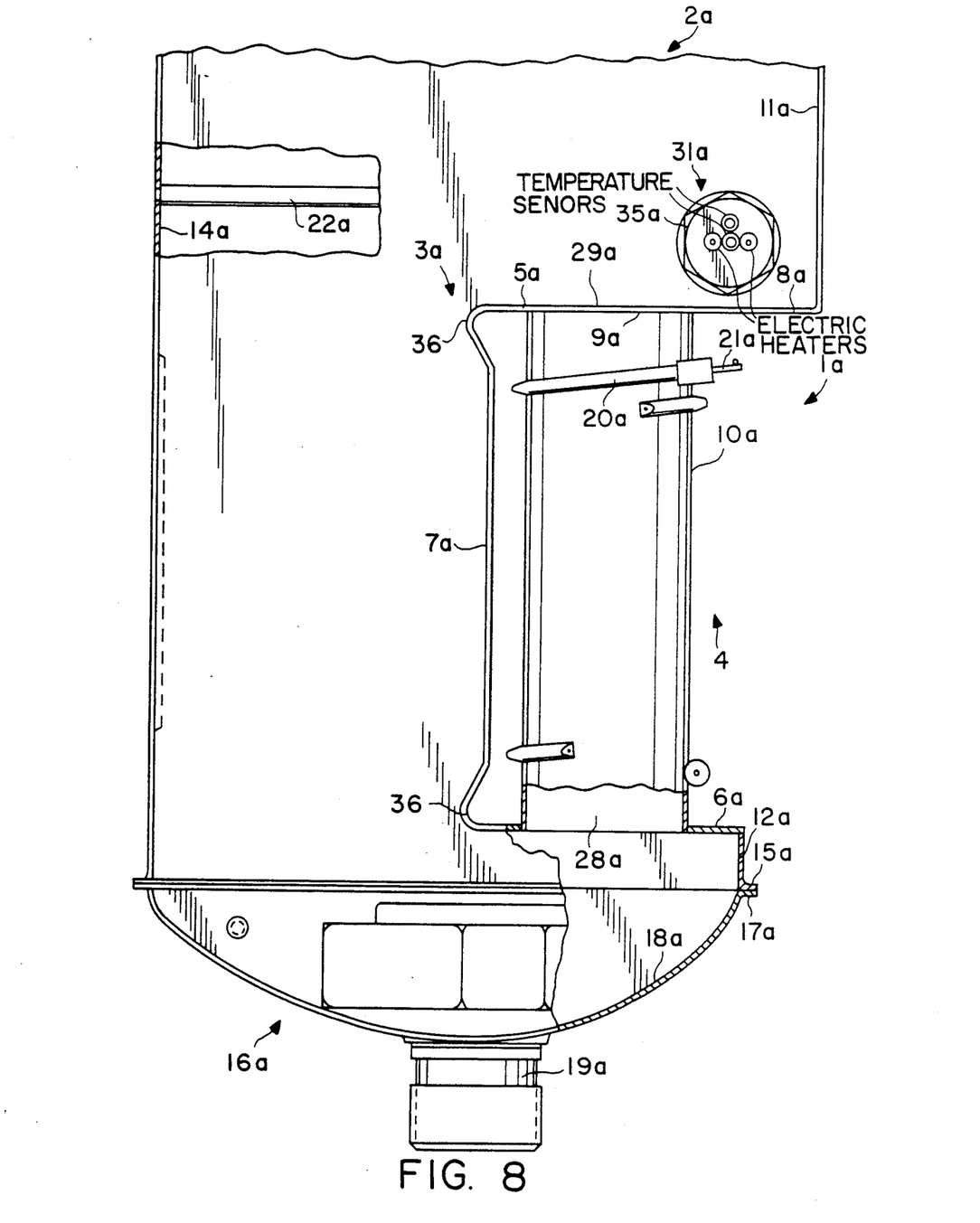
FIG. 8, Another embodiment in a view corresponding to FIG. 1.
Figure 9:
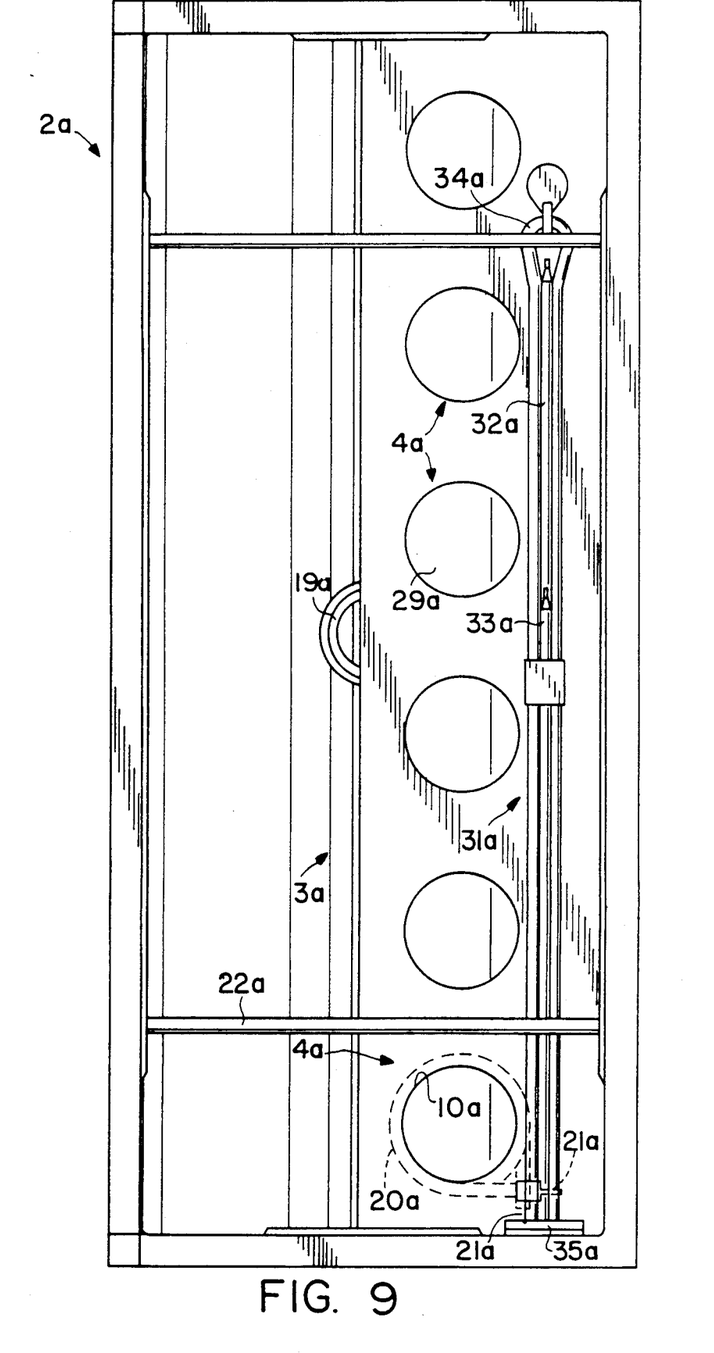
FIG. 9, The arrangement according to FIG. 8 in plan view.

In FIGS. 8 and 9 corresponding parts are given the same reference numerals as in FIGS. 1 to 7, but followed by the letter a.

In the embodiment according to FIGS. 8 and 9 there is only one row of continuous flow heaters 4a. The connection ends 21a of heating resistor 20a of each continuous flow heater 4a are in this case approximately at right angles to one another, although a parallel orientation is conceivable.

The fixing edge 8a is located in the vicinity of each flange plate 5a or 6a in the plane of the plate part 9a receiving the continuous flow tubes 10a. In this case the reinforcement of support 3a is again achieved through corrugation-like profile pieces 36, which are provided in the transition area between the flange plates 5a, 6a and the rear wall 7a and which project as resilient expansion compensation profiles over the outside thereof, but not over the sides of flange plates 5a, 6a.

We claim:

1. A medium heating unit comprising:
a continuous flow heater having at least one continuous flow tube, each tube providing tube ends;
heating means associated with at least one of said tubes for heating the medium;
at least one mounting member having flange plates rigidly fixed to said tube ends and,
wherein a rear wall connected to the flange plates together with said flange plates and said at least one flow tube forms a united, preassembled unit comprising rigidly interconnected parts, adapted to be fixed as a subassembly in an opening in a wall of a medium reservoir having overlapping portions located above and below said preassembled unit, said rear wall connecting said flange plates, thereby forming a niche-like receptacle in the reservoir receiving said at least one continuous flow tube.

2. The heating unit according to claim 1, wherein said flange plates and said rear wall are provided by a U-shaped and one-part component of sheet material, at least one said at least one continuous flow tube being fixed to said flange plates at remote sides thereof.

3. The heating unit according to claim 1, wherein at least one of said flange plates is provided with an insert opening for plug-like receiving an end of at least one said at least one continuous flow tube, said insert opening being closely adapted to said end.

4. The heating unit according to claim 3, wherein said insert opening is bounded by a collar adapted to project into the medium reservoir at least by an extension as large as a material thickness of said at least one flange plate.

5. The heating unit according to claim 1, wherein at least one of said flange plates provides a plate section in the vicinity of at least one said continuous flow tube, said plate section being offset towards an opposite flange plate by means of bends, and an associated one of said tube ends of at least one said at least one continuous flow tube being fixed to said plate section.

6. The heating unit according to claim 5, wherein said plate section extends continuously in an offset manner between said flange plates and to the rear wall, thereby forming a step-shaped fixing edge passing beyond an outer edge of a U-shaped component defined by said flange plates and said rear wall.

7. The heating unit according to claim 1, further comprising the provision of a profile section at a transition between said rear wall and at least one of said flange plates, the profile section projecting as a corrugation from said rear wall, said profile section having acute-angled profile legs.

8. The heating unit according to claim 1, wherein a plurality of substantially identical said continuous flow tubes are arranged in at least one longitudinal row.

9. The heating unit according to claim 8, wherein said plurality of said continuous flow tubes are arranged in staggered manner in at least two substantially parallel longitudinal rows, the central spacing between at least two of said at least two longitudinal rows being smaller than an external diameter of at least one said continuous flow heater.

10. The heating unit according to claim 1, wherein said heating means comprises a heating resistor on an outer circumference of each of a number between one and all said at least one continuous flow tube, the heating resistor providing a helical tubular heater fixed to the continuous flow tube by a metallic junction.

11. The heating unit according to claim 10, wherein said number of heating resistors provide connecting ends, all the connecting ends being located substantially on a side of the at least one continuous flow tube remote from said rear wall.

12. The heating unit according to claim 1, wherein the flanges are shaped such that, in combination with a medium reservoir defined substantially by walls, said mounting member forms a box-like component adapted to project in substantially contact-free manner beyond one of the walls and into the medium reservoir, the box-like component having substantially constant internal cross-sections on at least one of two sides located below and above said box-like component.

13. The heating unit according to claim 1, wherein said flange plates and said rear wall are defined by a component which is U-shaped in cross-section, said rear wall being substantially planar.

14. The heating unit according to claim 1, wherein at least one said at least one continuous flow tube has remote ends and each of said flange plates has an outer flange side facing away from said niche-like receptacle, at least one end of at least one said at least one continuous flow tube being fixed to an associated one of said flange plates from the outer flange side.

15. The heating unit according to claim 1, wherein said mounting member forms a box-like component.

16. The heating unit according to claim 15, wherein said mounting member provides a trough bounded on five sides transversely located with respect to each other.

17. The heating unit according to claims 15 or 16, wherein said mounting member is an integral piece of deep drawn sheet metal.

18. The heating unit according to claims 1 or 15, wherein said mounting member provides a strip-like continuous mounting edge forming a border flange, the border flange being outwardly offset with respect to the flange plates.

19. The heating unit according to claim 18, wherein said mounting member is shaped such that, in combination with a reservoir, said mounting member projects freely into said reservoir, said mounting member providing a substantially contact-free projecting bracket.

20. The heating unit according to claim 15, wherein said mounting member is shaped such that said mounting member is adapted to project freely into the reservoir, said mounting member providing a substantially contact-free projecting bracket.

21. A medium heating unit, comprising:
a medium reservoir having walls and provided to receive a medium in an interior;
a continuous flow heater having at least one continuous flow tube providing tube ends;
a mounting member having a rear wall and flange plates rigidly fixed to said tube ends, said mounting member being fixed in an opening in a wall of said medium reservoir, and wherein with said mounting member is associated with at least one reinforcing bar connecting walls of said medium reservoir, said at least one reinforcing bar being positioned above said mounting member transverse to said rear wall, said mounting member projecting into said medium reservoir with the ends of said at least one flow tube communicating with said interior.

22. The medium heating unit according to claim 21, wherein said reinforcing bar when seen in plan view is curved around the end of at least one said flow tube located below said reinforcing bar.

23. A medium heating unit, comprising:
a medium reservoir having walls and adapted to receive a medium;
a continuous flow heater having at least one continuous flow tube providing tube ends, each tube providing an inlet opening, an outlet opening and said reservoir defining flow areas directly adjacent to said openings, one of said flow areas being located directly below said at least one tube inlet opening and an other one of said flow areas being located directly above said at least one tube outlet opening;
a mounting member having a rear wall and flange plates rigidly fixed to said tube ends, said mounting member being fixed to at least one of said walls of said medium reservoir, and wherein at least one sensor arrangement having at least one temperature sensor of a temperature setting device is arranged in at least one of said flow areas of at least one said tube, said mounting member defining a niche-like receptacle in said reservoir.

24. The heating unit according to claims 21 of 23, wherein in combination with said reservoir at a limited distance directly below a lower one of said flange plates is provided a sump having a base wall rising from below said continuous flow heater towards an open side of said niche-like receptacle.

25. The heating unit according to claim 24, wherein said sump is flat shell-shaped and channel-like.

26. A medium heating unit, comprising:

a medium reservoir having walls and determined to receive a medium;

a heater for heating the medium, said heater together with said reservoir defining flow areas for the medium;

at least two tubular temperature sensors forming at least one sensor arrangement associated with the reservoir and positioned to be in contact with the medium being heated, the temperature sensors being filled with an expansion fluid and disposed directly adjacent to one another, at least two of said at least two temperature sensors being exposed to a sensor heater by different thermal coupling characteristics, said sensor heater being associated with said sensor arrangement and positioned to be in contact with the medium to be heated.

27. The medium heating unit according to claim 26, wherein said sensor heater is a hairpin-shaped tubular heater and is a heater apart from said heater for heating the medium.

28. The heating unit according to claim 26, wherein said heater is a continuous flow heater having openings providing an inlet opening and an outlet opening, one said at least one sensor arrangement being located in the vicinity of at least one of said openings.

29. The heating unit according to claims 23 or 26, wherein at least one said temperature sensor is located in one of said flow areas.

* * * * *